United States Patent
Penda et al.

(10) Patent No.: US 8,672,260 B2
(45) Date of Patent: Mar. 18, 2014

(54) SINGLE PLANE MOUNT SYSTEM FOR GAS TURBINE ENGINE

(75) Inventors: Allan R. Penda, Amston, CT (US); Brian D. Merry, Andover, CT (US); Gabriel L. Suciu, Glastonbury, CT (US); Christopher M. Dye, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 343 days.

(21) Appl. No.: 12/629,317

(22) Filed: Dec. 2, 2009

(65) Prior Publication Data
US 2011/0127368 A1 Jun. 2, 2011

(51) Int. Cl.
*B64D 27/00* (2006.01)

(52) U.S. Cl.
USPC ............................................. 244/54; 248/554

(58) Field of Classification Search
USPC ............... 244/51, 53 R, 54, 55; 248/554, 555
See application file for complete search history.

(56) References Cited

U.S. PATENT DOCUMENTS

| | | | |
|---|---|---|---|
| 3,979,087 A | 9/1976 | Boris et al. | |
| 4,428,189 A | 1/1984 | Greenberg et al. | |
| 4,531,694 A * | 7/1985 | Soloy | 244/54 |
| 4,658,579 A | 4/1987 | Bower et al. | |
| 5,409,184 A * | 4/1995 | Udall et al. | 244/54 |
| 5,427,348 A | 6/1995 | Bacon et al. | |
| 5,452,575 A | 9/1995 | Freid | |
| 5,467,941 A | 11/1995 | Chee | |
| 5,524,847 A | 6/1996 | Brodell et al. | |
| 5,620,154 A | 4/1997 | Hey | |
| 5,746,391 A * | 5/1998 | Rodgers et al. | 244/54 |
| 5,775,638 A | 7/1998 | Duesler | |
| 6,517,027 B1 | 2/2003 | Abruzzese | |
| 7,104,306 B2 * | 9/2006 | Huggins et al. | 164/47 |
| 7,156,343 B2 | 1/2007 | Marche | |
| 7,232,091 B2 * | 6/2007 | Marche | 244/54 |
| 7,267,301 B2 | 9/2007 | Dron | |
| 2005/0194493 A1 | 9/2005 | Marche | |
| 2005/0274485 A1 | 12/2005 | Huggins et al. | |
| 2008/0042008 A1 * | 2/2008 | Diochon et al. | 244/54 |
| 2008/0135679 A1 * | 6/2008 | Udall | 244/54 |

FOREIGN PATENT DOCUMENTS

| | | |
|---|---|---|
| EP | 1481896 A1 | 12/2004 |
| FR | 2921900 A1 | 4/2009 |
| GB | 2275308 | 8/1994 |

OTHER PUBLICATIONS

Extended European Search Report for EP Application No. 10252040.0 dated May 22, 2013.

* cited by examiner

*Primary Examiner* — Rob Swiatek
*Assistant Examiner* — Marc Burgess
(74) *Attorney, Agent, or Firm* — Carlson, Gaskey & Olds, P.C.

(57) ABSTRACT

A mounting system for a gas turbine engine assembly includes a plurality of mounting links attached the gas turbine engine along a single plane transverse to the engine centerline for separating the loads from the core engine.

17 Claims, 5 Drawing Sheets

SINGLE PLANE MOUNT SYSTEM FOR GAS TURBINE ENGINE

BACKGROUND

This disclosure generally relates to a mounting system and arrangement a gas turbine engine. More particularly, this disclosure relates to a mounting system and arrangement that reduces bending loads on the gas turbine engine.

A mounting system for a gas turbine engine provides for the transfer of engine thrust to an airframe. The same mounting system can also transfer air and maneuver loads onto the gas turbine engine during operation. The application of loads on the gas turbine engine can cause deflection of engine components. Conventional engine mounting systems include several connections points between a pylon of the aircraft and the gas turbine engine. The several different mounting points further transmit air and maneuver loads encountered by the aircraft to the gas turbine engine. It is desirable to limit the transference of external loads onto the gas turbine engines.

SUMMARY

A mounting system for a gas turbine engine assembly is disclosed and includes a plurality of mounting links attached the gas turbine engine along a single plane transverse to the engine centerline. The disclosed mounting system includes an outer link assembly, an upper thrust link, and lower thrust links all attached to the engine within the single plane. Each of the links further is attached to a support structure mounted to an airframe section. The mounting system supports the gas turbine engine along the single plane to separate loads from the core engine.

These and other features disclosed herein can be best understood from the following specification and drawings, the following of which is a brief description.

DETAILED DESCRIPTION

Figure 1:
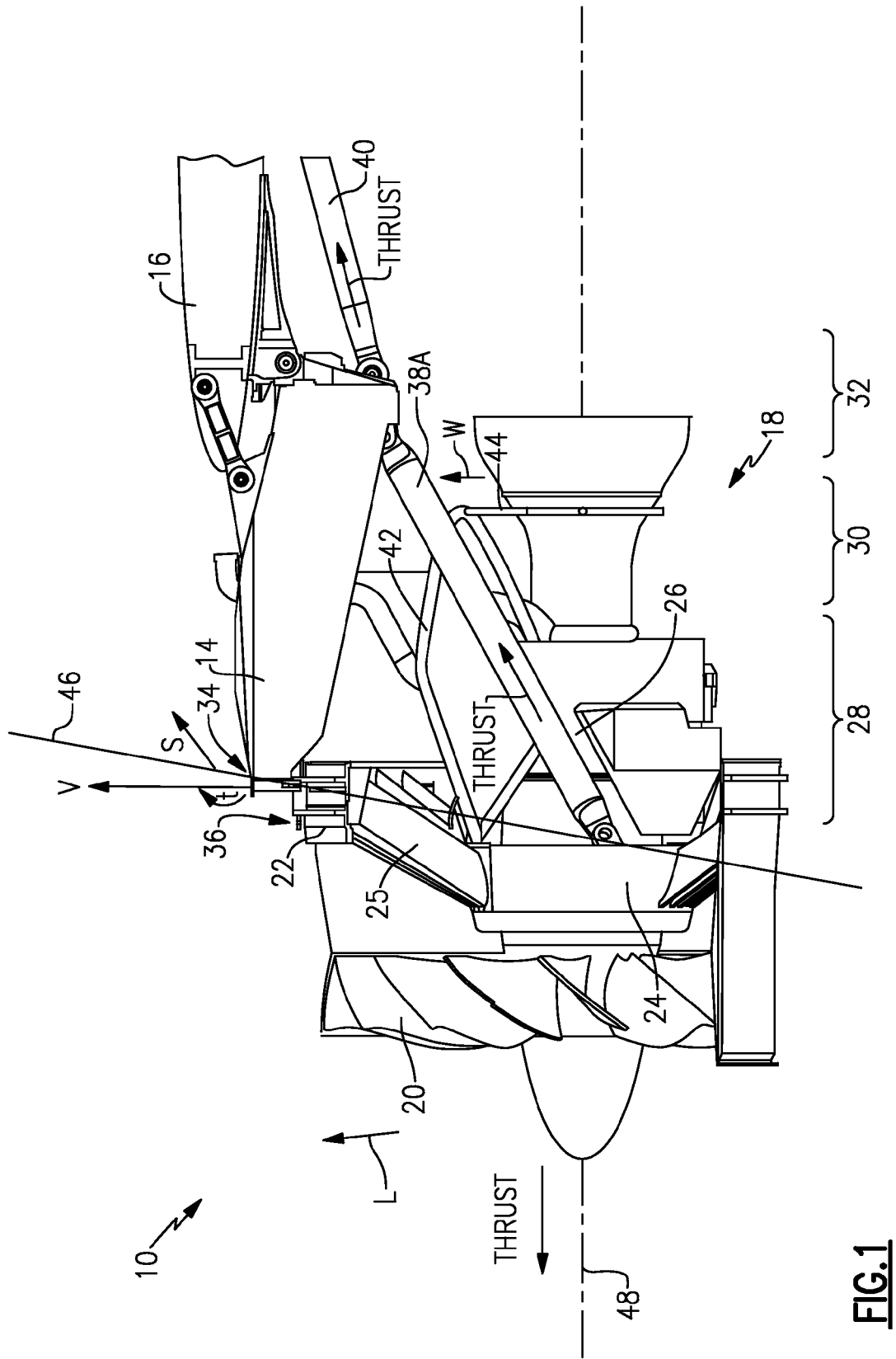
FIG. 1 is a sectional view of an example gas turbine engine mounting system.

Referring to FIG. 1, a mounting system for a gas turbine engine assembly 10 is disclosed and includes an outer link assembly 34, an upper thrust link 36 and first and second thrust links 38A and 38B (only 38A shown here) that are attached to the gas turbine engine 10 along a single plane 46 to a support structure 14 mounted to an airframe section 16. The example gas turbine engine assembly 10 includes a core engine 18 centered along an axis 48 that drives a fan 20 for generating a desired amount of thrust T. The example support structure 14 is a portion of a pylon mounted to a wing of an aircraft; however, the other engine mounting locations and structures are within the contemplation of this disclosure.

The example core engine 18 includes a compressor section 28 that feeds incoming air to a combustor section 30. Fuel is mixed with the incoming air and ignited in the combustor section 30 to produce a flow of gases that drives the turbine section 32. The turbine section 32 in turn drives the compressor section 28 and the fan 20. An outer nacelle 12 surrounds the fan 20 and directs airflow into the core engine 18.

During operation the mounting system transfer thrust T to the airframe section 16 and is vertically, laterally, and torsionally stiff to withstand engine torque and maneuver loads while providing for airflow through the engine assembly 10. Further, larger sizes of fans 20 necessarily require larger opening nacelle section 12 that in turn increases air loading L during takeoff and other high angle of attack maneuvers. The disclosed mounting systems supports the gas turbine engine along the single plane 46 to separate the air loads L and other maneuver loads from the core engine 18. The separation of the air loads L and maneuver loads reduces bending stress on the core engine 18.

The gas turbine engine assembly 10 includes a fan case 22 centered on the centerline 48 and is radially spaced from a front case 24 of the core engine 18 by a plurality of guide vanes 25. An intermediate case 26 is disposed just aft of the front case 24. The outer link assembly 34 and the upper thrust link 36 secure the fan case 22 to the support 14. The outer link assembly 34 supports vertical V and side S loads produced or exerted on the gas turbine engine 10. The upper thrust link 36 accommodates torque loads t produced and/or exerted on the engine 10 from air loading L.

The lower thrust links 38A and 38B are attached on one end to the front case 24 and on a second end to the support 14. A center thrust link 40 further transfers thrust produced by the engine assembly 10 to the airframe 16. The lower thrust links 38A and 38B transfers thrust produced by the engine assembly 10 to the support structure 14 and into the center thrust link 40 and the airframe 16.

Each of the attachment points to the engine assembly 10 for the outer link assembly 34, the upper thrust link 36 and the lower thrust links 38A and 38B are disposed within the single common plane 46 transverse to the centerline 48.

A core support structure 42 is attached to the front case 24 and the intermediate case 26 to support the weight of the core engine 18. The core support 42 is cantilevered rearward to hang over the core engine 18 at a position aft of the intermediate case 26. A support link 44 extends from the core support structure 42 to accommodate and support the weight W of the core engine 18.

Figure 2:
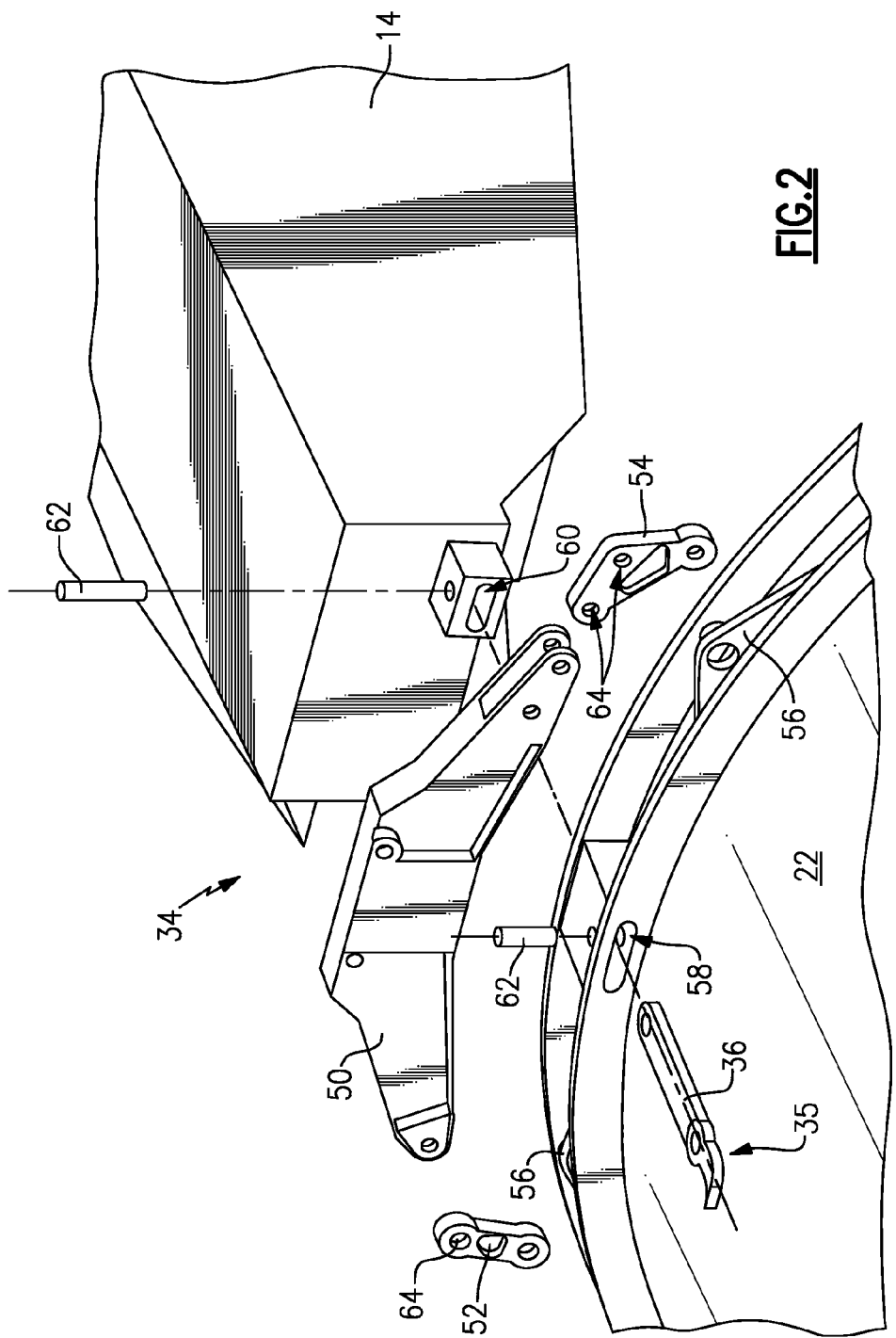
FIG. 2 is an exploded view of an example outer link assembly of the mounting system.

Referring to FIG. 2, the outer link assembly 34 is a four bar linkage including a fixed link 50 that mounts to the support structure 14. The fixed link 50 is disposed within the plane 46 and extends outward relative to the 48 centerline of the engine assembly 10. The fixed link 50 includes arms that extend outward and received a first link 52 and a second link 54. The first link 52 includes one opening 64 for pivotal attachment to the fixed link 50. The single attachment point between the first link 52 and the fixed link 50 constrains relative vertical movement, but allows relative side to side movement The second link includes two openings 64 that are attached to corresponding openings in the fixed link 50. The two point attachment between the second link 54 and the fixed link constrain vertical and side to side movement of the engine assembly 10 relative to the support structure 14.

The upper thrust link 36 extends through a slot 58 of the fan case 22 and is received within a pocket 60 defined by the support structure 14. A mounting fastener 62 secures the thrust link 36 within the slot 58 and the pocket 60. The thrust link 36 includes a handle portion 35 that aids the attachment process of the gas turbine engine 10 to the support structure.

Figure 3:
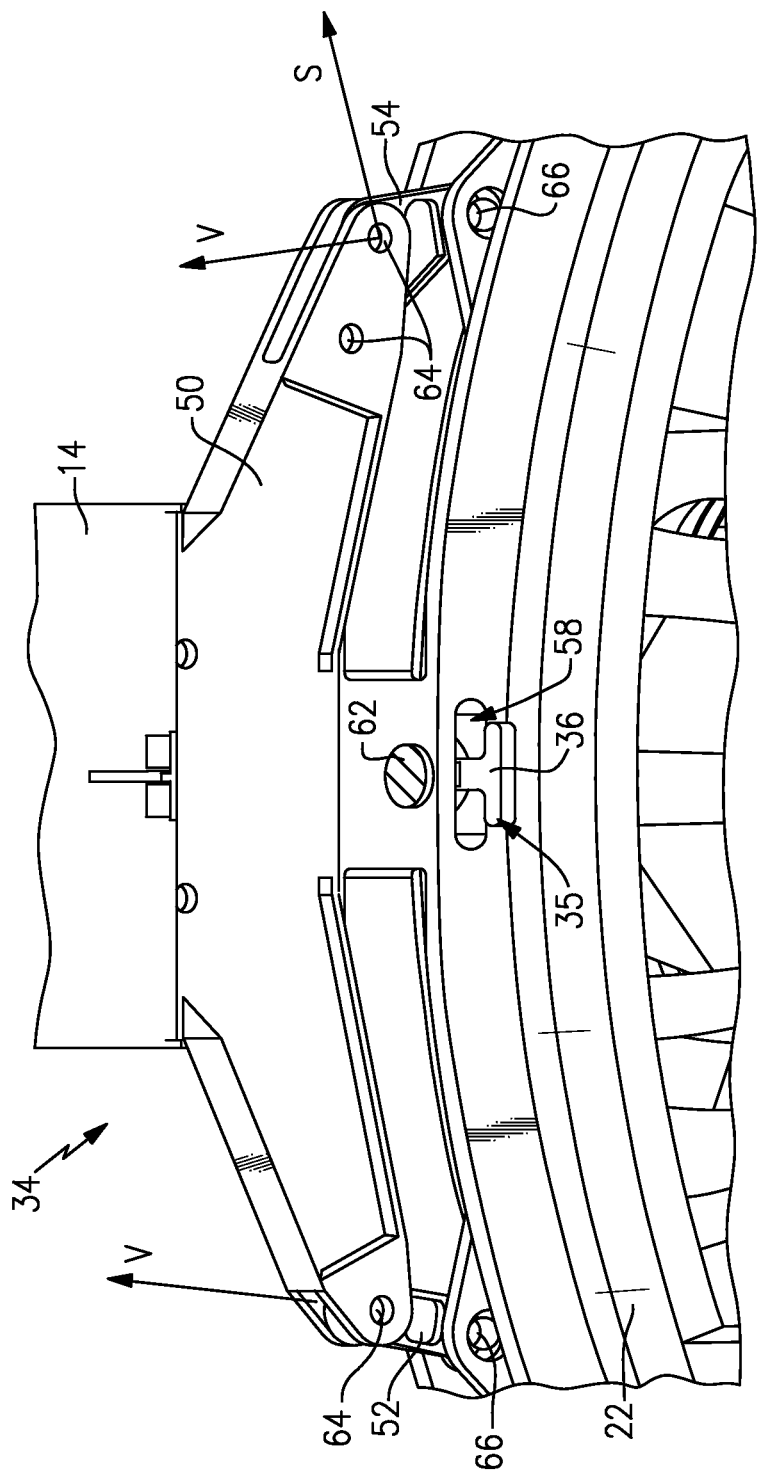
FIG. 3 is a front view of the example outer link assembly and upper thrust link of the mounting system.
Figure 4:
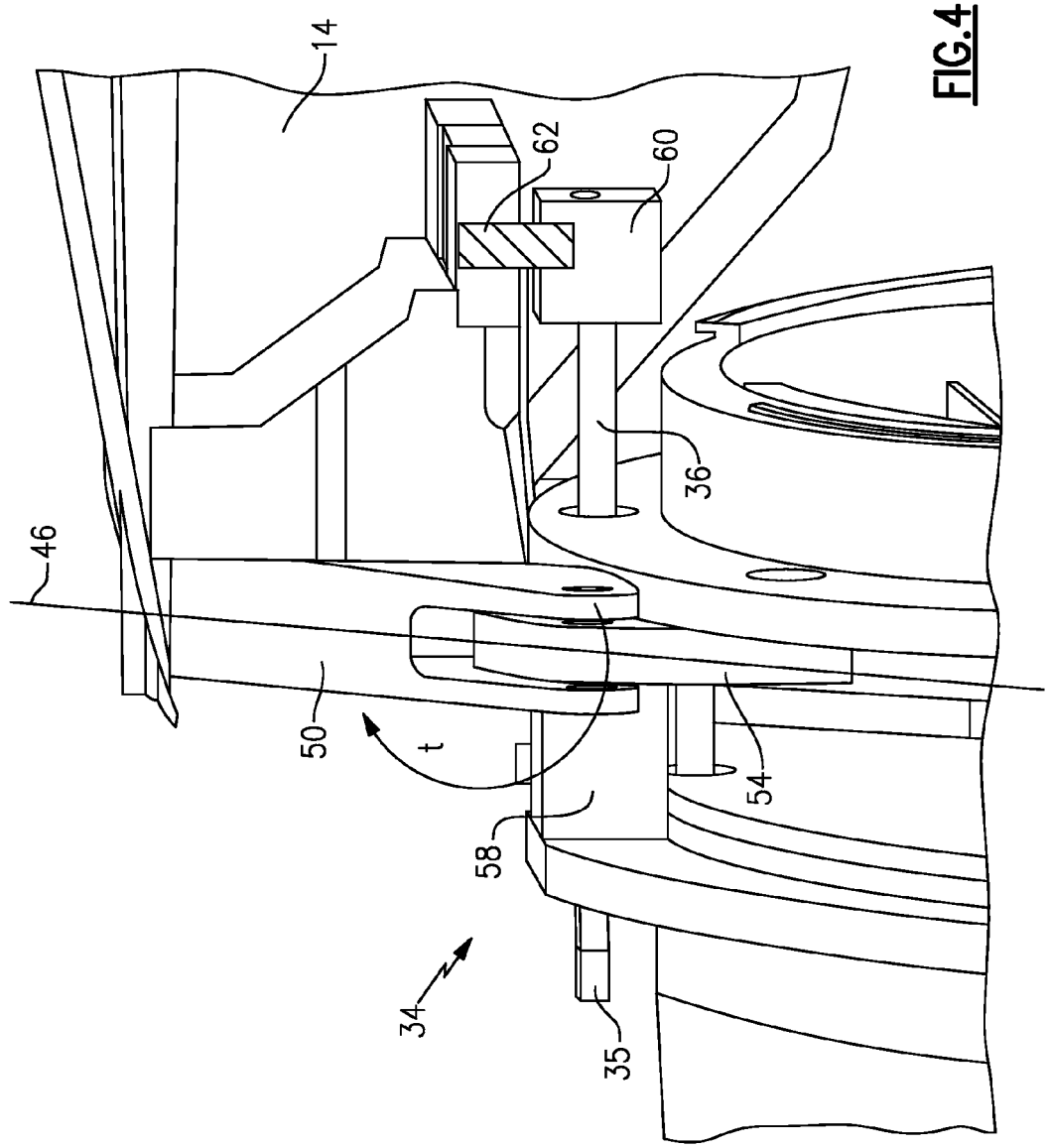
FIG. 4 is a partial perspective view of the outer link assembly and upper thrust link of the mounting system.

Referring to FIGS. 3 and 4, the assembled outer link assembly 34 and thrust link 36 is shown attached to the fan case 22. The first and second links 52 and 54 are attached to the fan case 22 through opening 66 within lugs 56 that include openings to receive fasteners 62. The fasteners 62 may be of such a design as utilized in engine mounting systems to maintain the required loads and remain attached during engine operating conditions.

Both the first and second links support vertical loads V exerted by the weight of the engine assembly 10 and resulting from maneuvering loads exerted during aircraft operation. The second link 54 includes the two attachment points within the plane 46 to constrain and prevent side loads S.

The upper thrust link 36 is secured in place by the fasteners 62 and constrains torque loads t exerted on the outer link assembly 34. The torque loads t are encountered as a combination of thrust T produced by the engine assembly 10 and air loading L exerted on the nacelle 12 during take off and other high angle of attack maneuvers. The upper thrust link 36 is inserted through the slot 58 and received within the pocket 60 in the support structure 14 to provide the desired loading constraint, and also to aid in the mounting operation. The upper thrust link 36 is disposed parallel to the engine centerline 48. The thrust link 36 includes the handle 35 that can be utilized to either push the thrust link 36 into the pocket 60, or to pull the thrust link 36 from the pocket 60 when it is desired to remove the engine assembly 10.

The slot 58 of that receives the thrust link 36 is disposed within the single plane 46, along with the attachment points provided by the lugs 56 for the first and second links 52, 54 such that all loads are managed along the single plane 46. The example plane 46 is transverse to the center line of the core engine 18 to provide for the separation of bending stresses induced on the airframe by aircraft maneuvering loads from the core engine 18.

Figure 5:
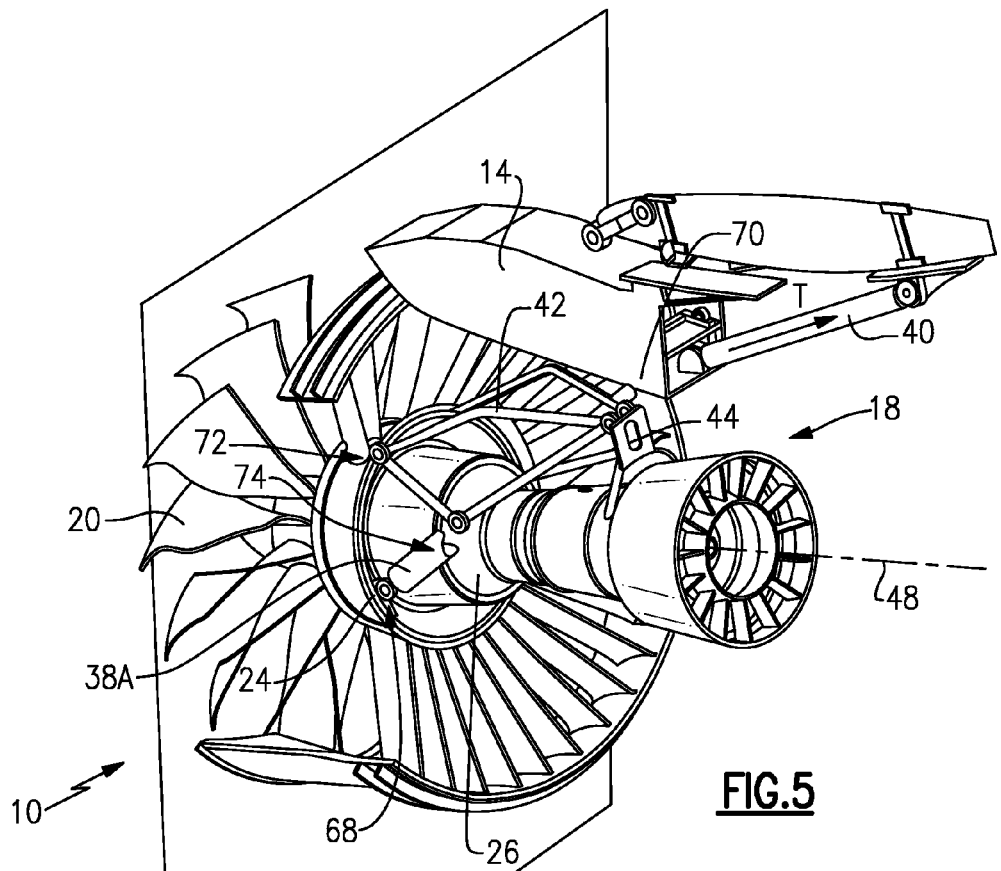
FIG. 5 is a rear perspective view of lower thrust links for the example mounting system.
Figure 6:
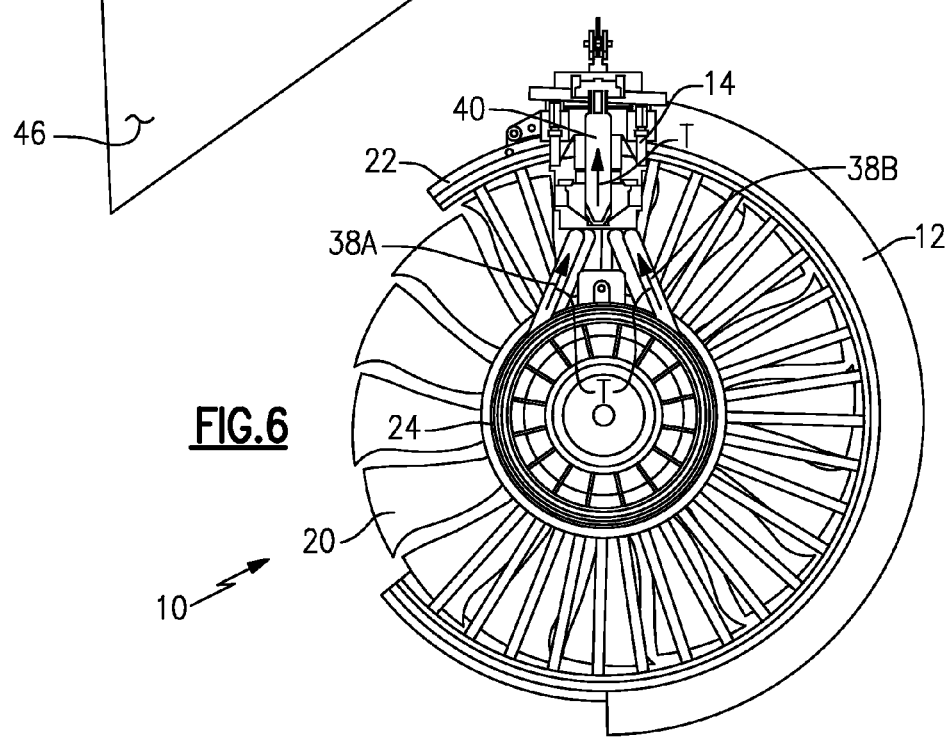
FIG. 6 is a rear view of the lower thrust links of the example mounting system.

Referring to FIGS. 5 and 6, two lower thrust links 38A and 38B that are attached on opposing sides of the engine centerline 48 to the front case 24. Each of the lower thrust links extend from the first attachment point end 68 on the front face case 24 upwardly to a second attachment point end 70 on the support structure 14. The first attachment point end 68 is disposed below the centerline 48 opposite from the side of the centerline 48 in which the outer link assembly 34 and upper thrust link 36 are attached.

The two lower thrust links 38A and 38B are angled inwardly from the first attachment point end 68 on an outer circumference of the front case 24, toward each other to the second attachment point end 70 on the support structure 14. The center thrust link 40 is attached to the support structure 14 between the second attachment point ends 70 of each of the lower thrust links 38A and 38B. The center thrust link 40 transfers thrust forces T transmitted from the front case 24 through the lower thrust links 38A and 38B to the airframe 16. The support structure 14 also receives and transfers the thrust forces T to the airframe 16.

The thrust loads T transferred by the thrust links 38A and 38B are transmitted through the first attachment point ends 68 that are disposed within the plane 46. Therefore, all of the loads exerted or placed on the engine assembly 10 are transferred through attachment points within a single plane that in turn reduces and substantially eliminates transference of bending loads into the core engine 18.

A core support structure 42 is provided to accommodate loads exerted by the cantilevered aft end of the engine core 18. The core support 42 is attached to the front case 24 at attachment point 72 and to the intermediate case 26 at the attachment point 74. The attachment point 72 is disposed within the plane 46. The core support 42 extends aft of the intermediate case 26 in a cantilevered manner. A support link 44 extends from the aft end of the core support 42 and attached to the core engine 18. The support link 44 supports the core engine at a location aft of the intermediate case 26 to support the core engine weight to reduce and/or eliminate bending stresses caused by the weight of the core engine 18.

Accordingly, the disclosed mounting system supports the gas turbine engine assembly 10 along a single plane transverse to the engine centerline 48 to separate bending stresses encountered by the airframe during operation from the core engine 18.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A mounting system for securing a gas turbine engine to an aircraft support structure comprising:
   an outer link assembly attachable to the aircraft support structure and the gas turbine engine, the outer link assembly including first and second links disposed in a first plane transverse to the centerline of the gas turbine engine;
   an upper thrust link disposed along the centerline, wherein the outer link assembly supports vertical loads produced by the gas turbine engine, wherein vertical loads of the gas turbine engine are only supported by structures disposed within the first plane and the upper thrust link extends from an axial forward surface through a slot defined through an outer case of the gas turbine engine within the first plane and into a pocket defined on the aircraft support structure and is secured within the slot and the pocket by at least one fastener extending through the slot, pocket and upper thrust link; and
   at least one lower thrust link attachable to the aircraft support structure and the gas turbine engine, the at least one lower thrust link attached to the gas turbine engine at a mount location within the first plane transverse to the centerline of the gas turbine engine, wherein the at least one lower thrust link transfers thrust loads produced by the gas turbine engine, and does not support vertical loads produced by the gas turbine engine.

2. The mounting system as recited in claim 1, wherein the first and second links of the outer link assembly are attached on one end to outer surface of the outer case of the gas turbine engine and at a second end to a fixed link secured to the support structure.

3. The mounting system as recited in claim 2, wherein one of the first and second links are pivotally secured to the fixed link for movement within the first plane transverse to the centerline of the gas turbine engine.

4. The mounting system as recited in claim 2, wherein one of the first and second links is secured to the fixed link to constrain movement within the first plane transverse to the centerline of the gas turbine engine.

5. The mounting system as recited in claim 2, wherein the first and second links are attached to the outer case at circumferentially spaced apart locations within the first plane.

6. The mounting system as recited in claim 2, wherein the upper thrust link is attached to the outer case parallel to the centerline of the gas turbine engine and on a second end to the aircraft support structure.

7. The mounting system as recited in claim 1, wherein the at least one lower thrust link comprises first and second lower thrust links securable to a front case of the gas turbine engine within the first plane.

8. The mounting system as recited in claim 7, wherein each of the first and second lower thrust links are securable to an outer perimeter of the front case at a location within the first plane on a side opposite the gas turbine engine centerline from the outer link assembly.

9. The mounting system as recited in claim 7, wherein each of the first and second lower thrust links are securable to the aircraft support structure at a location centered over the gas turbine engine centerline.

10. The mounting system as recited in claim 9, including a center thrust link attachable to the aircraft support structure at the location where the first and second lower thrust links are secured and to a position on the support structure aft of the location where the first and second lower thrust links are secured.

11. The mounting system as recited in claim 1, including a core support securable to a front case of the gas turbine engine within the first plane and including a support link attached to a core portion of the gas turbine engine spaced axially aft from the first plane.

12. The mounting system as recited in claim 11, wherein the core support is securable at a second location to an intermediate case of the gas turbine engine disposed between the front case and the support link.

13. The mounting system as recited in claim 1 wherein the outer link assembly is secured to the aircraft support structure at a location forward of the location at which the at least one lower thrust link is attached to the aircraft support structure.

14. A gas turbine engine comprising:
a core engine assembly including a fan case and a front case disposed along an engine centerline;
a support structure mountable to an aircraft;
an outer link assembly attached to the fan case and to the support structure along a first plane transverse to the centerline, the outer link supporting vertical loads produced by the gas turbine engine transverse to the engine centerline, wherein vertical loads of the gas turbine engine are only supported by structures disposed within the first plane;
an upper thrust link attached to the fan case and to the support structure along the centerline within the first plane, wherein the upper thrust link extends through a slot defined on the fan case within the first plane and into a pocket defined on the support structure and is secured within the slot and the pocket by at least one fastener extending through the slot, pocket and upper thrust link; and
first and second lower thrust links attached to the front case within the first plane at a first end and to the support structure at a second end, wherein the first and second lower thrust links transfer thrust to the support structure, and do not support vertical loads produced by the gas turbine engine.

15. The gas turbine engine as recited in claim 14, wherein the outer link assembly includes first and second links attached to the fan case on one end and to a fixed link on a second end, the fixed link attached to the support structure and the first and second links spaced circumferentially apart from each other.

16. The gas turbine engine as recited in claim 15, wherein the first link is pivotally attached to both the fan case and the fixed link to constrain relative vertical movement between the core engine and the support structure and the second link includes two attachment points to the fixed link to constrain vertical and side movement of the core engine relative to the support structure.

17. The gas turbine engine as recited in claim 14, including a core support securable to the front case of the gas turbine engine within the first plane and including a support link attached to a core portion of the gas turbine engine spaced axially aft from the first plane, wherein the core support is securable at a second location to an intermediate case of the gas turbine engine disposed between the inner case and the support link.

* * * * *

UNITED STATES PATENT AND TRADEMARK OFFICE
CERTIFICATE OF CORRECTION

| | | |
|---|---|---|
| PATENT NO. | : 8,672,260 B2 | Page 1 of 1 |
| APPLICATION NO. | : 12/629317 | |
| DATED | : March 18, 2014 | |
| INVENTOR(S) | : Penda et al. | |

It is certified that error appears in the above-identified patent and that said Letters Patent is hereby corrected as shown below:

IN THE CLAIMS:

Claim 1, column 4, line 28: delete "the" and replace with --a--

Claim 17, column 6, line 39: delete "inner" and replace with --front--

Signed and Sealed this
Twenty-fourth Day of June, 2014

Michelle K. Lee
*Deputy Director of the United States Patent and Trademark Office*